(12) United States Patent
Hirth et al.

(10) Patent No.: US 10,837,337 B2
(45) Date of Patent: Nov. 17, 2020

(54) COMPONENT OF AN EXHAUST GAS SYSTEM AND METHOD FOR EXHAUST GAS AFTER-TREATMENT

(71) Applicant: CONTINENTAL AUTOMOTIVE GmbH, Hannover (DE)

(72) Inventors: Peter Hirth, Rösrath (DE); Christoph Pabst, Melle (DE); Christian Schorn, Lohmar (DE); Egbert Zienicke, Lohmar (DE)

(73) Assignee: Vitesco Technologies GmbH, Hannover (DE)

( * ) Notice: Subject to any disclaimer, the term of this patent is extended or adjusted under 35 U.S.C. 154(b) by 14 days.

(21) Appl. No.: 16/326,107

(22) PCT Filed: Aug. 15, 2017

(86) PCT No.: PCT/EP2017/070655
§ 371 (c)(1),
(2) Date: Feb. 15, 2019

(87) PCT Pub. No.: WO2018/033529
PCT Pub. Date: Feb. 22, 2018

(65) Prior Publication Data
US 2019/0186317 A1    Jun. 20, 2019

(30) Foreign Application Priority Data

Aug. 16, 2016   (DE) .......................... 10 2016 215 290

(51) Int. Cl.
*F01N 13/08*    (2010.01)
*F01N 3/20*    (2006.01)
(Continued)

(52) U.S. Cl.
CPC ............. *F01N 3/2006* (2013.01); *F01N 3/10* (2013.01); *F01N 3/20* (2013.01); *F01N 3/206* (2013.01);
(Continued)

(58) Field of Classification Search
CPC ...... F01N 1/084; F01N 3/0205; F01N 3/0234; F01N 3/2889; F01N 2240/02; F01N 2470/24; F01N 2490/06
See application file for complete search history.

(56) References Cited

U.S. PATENT DOCUMENTS 5,814,284 A    9/1998 Schlüter
5,902,558 A    5/1999 Maus et al.
(Continued)

FOREIGN PATENT DOCUMENTS

CN    2071253 U    2/1991
DE    1215852    1/1965
(Continued)

OTHER PUBLICATIONS

Machine translation of DE1215852B, accessed May 10, 2020. (Year: 2020).*
(Continued)

*Primary Examiner* — Jonathan R Matthias
(74) *Attorney, Agent, or Firm* — Cozen O'Connor

(57) ABSTRACT

A component of an exhaust gas system and a method for exhaust gas after-treatment having a housing with an inlet and an outlet for an exhaust gas, an annular heat exchanger through which the exhaust gas can flow from the inlet in an axial direction and along a first flow path. Downstream of the heat exchanger, an annular catalyst body is arranged inside the heat exchanger and through which the exhaust gas can flow in a radial direction, such that, downstream of the catalyst body, the exhaust gas flows through the heat
(Continued)

exchanger in the radial direction and along a second flow path.

16 Claims, 1 Drawing Sheet

(51) Int. Cl.
  *F01N 3/28* (2006.01)
  *F01N 5/02* (2006.01)
  *F01N 3/10* (2006.01)

(52) U.S. Cl.
  CPC ......... *F01N 3/2013* (2013.01); *F01N 3/2066* (2013.01); *F01N 3/2889* (2013.01); *F01N 3/2892* (2013.01); *F01N 5/02* (2013.01); *F01N 2240/02* (2013.01); *F01N 2240/16* (2013.01); *F01N 2470/08* (2013.01); *F01N 2470/24* (2013.01); *F01N 2610/02* (2013.01); *F01N 2610/03* (2013.01); *Y02T 10/16* (2013.01); *Y02T 10/24* (2013.01); *Y02T 10/26* (2013.01)

(56) References Cited

U.S. PATENT DOCUMENTS

| | | | | |
|---|---|---|---|---|
| 2011/0192141 A1* | 8/2011 | Schepers | ............... | F28D 7/0075 60/274 |
| 2014/0251579 A1* | 9/2014 | Sloss | .................. | F28D 21/0003 165/96 |

FOREIGN PATENT DOCUMENTS

| | | |
|---|---|---|
| DE | 3920159 | 1/1991 |
| DE | 19927246 | 12/2000 |
| DE | 10117086 | 10/2002 |
| DE | 102008044711 | 3/2010 |
| DE | 10235691 | 12/2011 |
| DE | 102011119162 | 5/2013 |
| EP | 0676534 | 8/1998 |
| EP | 1065352 | 1/2001 |
| EP | 1801372 | 6/2007 |
| GB | 413967 | 7/1934 |
| JP | 2005-299474 | 10/2005 |
| JP | 2012-500930 | 1/2012 |
| KR | 1020150064111 | 6/2015 |
| WO | WO 2014107129 | 7/2014 |

OTHER PUBLICATIONS

Office Action dated May 18, 2020 issued in Korean Patent Application No. 10-2019-7006557.

* cited by examiner

COMPONENT OF AN EXHAUST GAS SYSTEM AND METHOD FOR EXHAUST GAS AFTER-TREATMENT

CROSS REFERENCE TO RELATED APPLICATIONS

This is a U.S. national stage of application No. PCT/EP2017/070655, filed on Aug. 15, 2017. Priority is claimed on German Application No. DE102016215290.4, filed Aug. 16, 2016, the content of which is incorporated herein by reference.

BACKGROUND OF THE INVENTION

Field of the Invention

The present invention concerns a component of an exhaust gas system and a method for exhaust gas after-treatment. The exhaust gas system is in particular associated with an internal combustion engine.

In modern internal combustion engines, effective exhaust gas treatment is necessary in all operating points. In particular, the removal of pollutants must be ensured even at low temperatures and shortly after start-up of the internal combustion engine. Numerous devices are known that can cause an increase in exhaust gas temperature e.g. by heat exchangers, so that a temperature necessary for catalytic conversion of pollutants is reached more quickly. A heat exchanger may also be used to recover energy, in particular from the heat of the exhaust gas.

The use of heat exchangers however in itself requires additional space, which is very difficult structurally to provide in motor vehicles. Also, known heat exchangers sometimes have disadvantages in respect of an efficient heat transfer.

SUMMARY OF THE INVENTION

An object of one aspect of the invention is to at least partially resolve the problems outlined in connection with the prior art, and in particular to provide a component of an exhaust gas system that can heat the exhaust gas or recover energy from the exhaust gas, and in particular can also reduce or convert pollutants in the exhaust gas. Furthermore, the component shall be designed in compact fashion. The method for exhaust gas treatment shall allow an efficient heat transfer and/or an effective exhaust gas treatment.

It should be pointed out that the features specified individually may be combined with one another in a technologically meaningful way and define further configurations of the invention. Furthermore, the features are rendered more precisely and explained in more detail in the description, with further preferred configurations of the invention being presented.

In this context, a component is proposed for an exhaust gas system of an internal combustion engine, wherein the component comprises at least one housing with an inlet and outlet for an exhaust gas. In the housing, an annular heat exchanger is provided through which exhaust gas leaving the inlet can flow in an axial direction and along a first flow path. Downstream of the heat exchanger, an annular catalyst body is arranged inside the heat exchanger in a radial direction through which the exhaust gas can flow at least in a radial direction, such that downstream of the catalyst body, the exhaust gas flows through the heat exchanger in the radial direction and along a second flow path.

In particular, heat-exchanger media (exhaust gas flowing along the respective other flow path; coolant e.g. water, oil etc.) flows through the heat exchanger. In particular, the heat is transferred between hot exhaust gas and a cooler heat-exchanger medium.

The component may be designed and configured such that in the heat exchanger, heat is transferred between exhaust gas streams along the first flow path and along the second flow path. In this case, for example, the exhaust gas flowing along the first flow path may be warmed by the exhaust gas flowing along the second flow path, which has already been heated from the exothermic reaction of the exhaust gas with the catalytically active constituents of the catalyst body. In this case, the heat exchanger in particular has no additional lines for receiving a further cooling medium (in addition to the exhaust gas streams described).

Where, in this description, the shape of the heat exchanger and/or the catalyst body and/or the outflow channel is described as "annular", which means that the heat exchanger or catalyst body or outflow channel is open centrally and is designed to run surround or enclose a central axis. The cross-section of the heat exchanger and/or the catalyst body and/or the outflow channel need not be circular, but as well as circular may also have the form of a closed polygon, an oval or similar, or be composed of modules.

It is furthermore proposed that the heat exchanger is configured so as to be electrically heatable. In particular, in this way exhaust gas flowing along the first flow path can be warmed so that a catalytic reaction begins for the first time in the catalyst body. Alternatively or additionally, electric heating may be arranged in the region of the catalyst body, so that a catalytic reaction is achieved at least locally with the exhaust gas flowing along the second flow path.

The arrangement of a catalyst body with through-flow in a radial direction, as known e.g. from DE 101 17 086 A, inside a heat exchanger allows a space-saving structure of the component. Furthermore, a large transfer area for the thermal energy, which is produced by the catalytic reaction of the exhaust gas, can thus be created on the outer circumferential face of the catalyst body with radial through-flow. Because the flow cross-section widens in the radial direction towards the outer circumferential face, the pressure loss caused by integration of the heat exchanger can be minimized.

The temperature of the exhaust gas on entry into the catalyst body may be increased by the heat exchanger, so that the exhaust gas system can be operated at lower exhaust gas temperatures as soon as a "light-off" temperature has been reached which is the temperature at which a catalytic and exothermic reaction occurs with constituents of the exhaust gas. Thus, measures for increasing the exhaust gas temperature, e.g. motorized measures or electrical heating, may be reduced or even omitted.

In particular, an annular outflow channel surrounds the heat exchanger outwardly in the radial direction so that the exhaust gas enters the outflow channel downstream of the second flow path and leaves the housing via an outlet.

In particular, the housing extends in the axial direction between the inlet, which is arranged on a first end face of the housing, and the outlet, which is arranged on a second end face of the housing.

According to a preferred embodiment, a deflection zone for deflecting the exhaust gas in an opposing axial direction is arranged downstream of the first flow path; wherein a central channel extending in the axial direction is arranged inside the catalyst body in the radial direction, and the exhaust gas leaving the deflection zone enters said channel and from there enters the catalyst body.

Preferably, a feed device for a preferably liquid reaction medium is arranged upstream of the first flow path or in the deflection zone. In particular, the feed device is arranged upstream of and outside the housing, e.g. in an exhaust gas line.

In particular, the feed device is provided for the supply of a reduction agent, e.g. urea-water solution or fuel.

In particular, the catalyst body comprises a plurality of flow channels for through-conduction of the exhaust gas, wherein the flow channels extend at least in the radial direction and in the axial direction, in particular at an angle to the axial directions of at least 60° [angular degrees], preferably at least 80°. In some cases, the flow channels may also extend in a circumferential direction. In particular, the flow channels inside the catalyst body are thus extended to increase a probability of pollutants from the exhaust gas coming into contact with the catalytically active constituents of the catalyst body.

According to a further preferred embodiment, along the first flow path, the surfaces of the heat exchanger contacting the exhaust gas have a structured surface, which is therefore larger than a flat surface. A structured surface may in particular be formed by a surface roughness which is greater than in other regions of the component, and/or an undulating surface. The structure has the property of enlarging a surface area compared with a flat/planar/smooth surface.

In particular, along the second flow path, the surfaces of the heat exchanger contacting the exhaust gas have a structured surface which is therefore larger than a flat surface. The statements relating to the first flow path apply here accordingly.

In particular, a heat exchange medium, in particular a further heat-exchanger medium not comprising the exhaust gas, flows through the heat exchanger only in the axial direction.

According to a preferred embodiment, at least one of the following components downstream of the catalyst body has a catalytic coating:
  surfaces of the heat exchanger along the second flow path; and
  an annular outflow channel, which surrounds the heat exchanger outwardly in the radial direction, so that the exhaust gas enters the outflow channel downstream of the second flow path and leaves the housing via an outlet.

Furthermore, a method for exhaust gas after-treatment for an internal combustion engine is proposed, wherein an exhaust gas is treated according to the following steps, in particular in the component now proposed:
  a. entry of the exhaust gas into an inlet of a housing of a component of an exhaust gas system;
  b. guidance of the exhaust gas in an axial direction and along a first flow path through an annular heat exchanger;
  c. deflection of the exhaust gas into a central channel which is arranged in a radial direction inside the heat exchanger and extends in the axial direction;
  d. deflection of the exhaust gas from the central channel in a radial direction; and
  e. entry of the exhaust gas into an annular catalyst body with through-flow at least in a radial direction, so that, downstream of the catalyst body, the exhaust gas flows through the heat exchanger in the radial direction and along a second flow path.

In particular, an annular outflow channel surrounds the heat exchanger outwardly in the radial direction, wherein in a step f, the exhaust gas enters the outflow channel downstream of the second flow path and is conducted in the axial direction towards an outlet of the housing of the component.

The statements concerning the component also apply to the method, and conversely.

Furthermore, a motor vehicle is proposed which comprises at least an internal combustion engine and an exhaust gas system with a component according to the invention, or with a component in which the exhaust gas is treated following the method according to the invention.

BRIEF DESCRIPTION OF THE DRAWINGS

The invention and the technical field will be explained in more detail below on the basis of the figures. It should be pointed out that the figures show particularly preferred embodiment variants of the invention, to which the invention is however not restricted. Here, identical components in the figures are denoted by the same reference signs. In the figures, in each case schematically.

DETAILED DESCRIPTION OF THE PRESENTLY PREFERRED EMBODIMENTS

Figure 1:
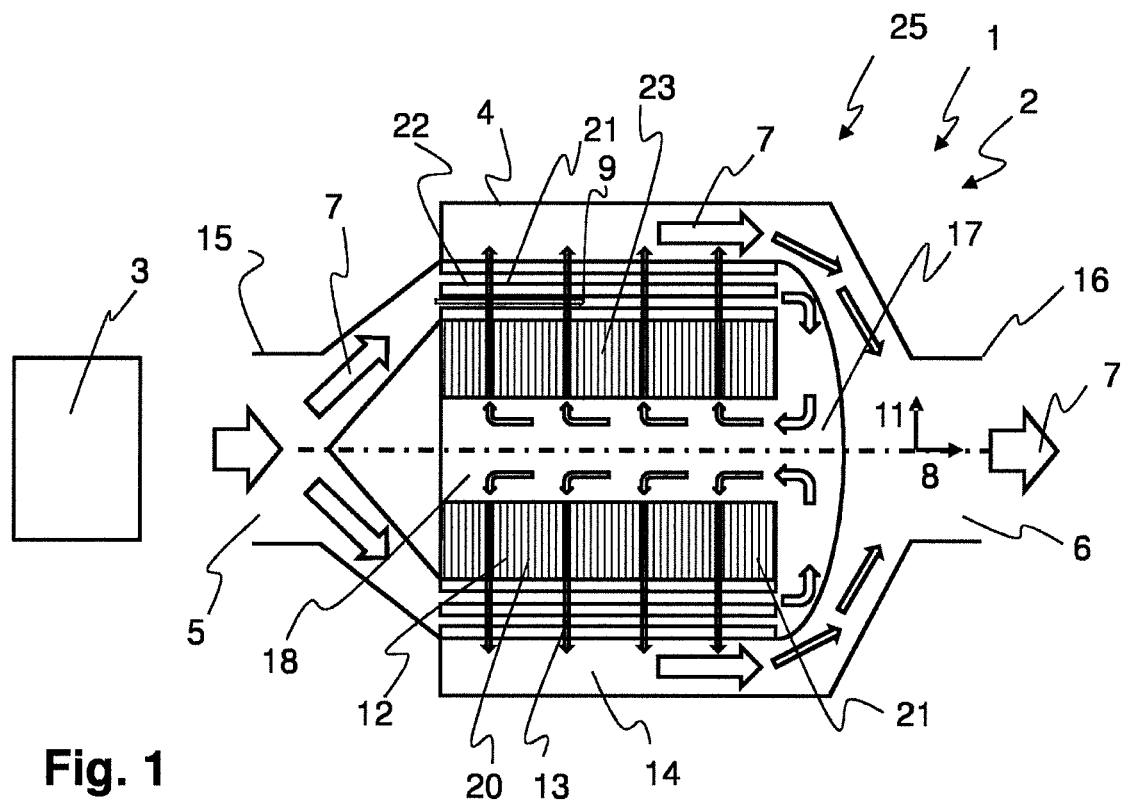
FIG. 1: is a sectional side view of a motor vehicle with an internal combustion engine and an exhaust gas system and a variant of a component.

FIG. 1 shows, in a sectional side view, a motor vehicle 25 with an internal combustion engine 3 and an exhaust gas system 2 and a first embodiment variant of a component 1. An exhaust gas 7 flows from an internal combustion engine 3 via an inlet 5 into the housing 4 of the component 1. The component 1 comprises the housing 4 with an inlet 5 and an outlet 6 for the exhaust gas 7. The housing 4 contains an annular heat exchanger 10 through which the exhaust gas 7 can flow starting from the inlet 5 in an axial direction 8 and along a first flow path 9, and downstream of the heat exchanger 10, an annular catalyst body 12 is arranged inside the heat exchanger 10 in a radial direction 11 and through which the exhaust gas 7 can flow at least in a radial direction 11. The exhaust gas 7 flows through the heat exchanger 10 downstream of the catalyst body 12 in the radial direction 11 and along the second flow path 13.

The temperature of the exhaust gas 7 on entry into the catalyst body 12 may be increased by the heat exchanger 10, so that the exhaust gas system 2 can be operated at lower exhaust gas temperatures as soon as a "light-off" temperature has been reached, which is the temperature at which a catalytic and exothermic reaction occurs with constituents of the exhaust gas 7. Thus, measures for increasing the temperature of the exhaust gas 7, e.g. motorized measures, electrical heating, may be omitted.

An annular outflow channel 14 surrounds the heat exchanger 10 outwardly in the radial direction 11 so that the exhaust gas 7 enters the outflow channel 14 downstream of the second flow path 13 and leaves the housing 4 via an outlet 6.

The housing 4 extends in the axial direction 8 between the inlet 5, which is arranged on a first end face 15 of the housing 4, and the outlet 6, which is arranged on a second end face 16 of the housing 4.

A deflection zone 17 for deflecting the exhaust gas 7 in an opposing axial direction 8 is arranged downstream of the first flow path 9; wherein a central channel 18 extending in the axial direction 8 is arranged inside the catalyst body 12 in the radial direction 11, and the exhaust gas 7 leaving the deflection zone 17 enters said channel and from there enters the catalyst body 12.

The catalyst body 12 has a plurality of flow channels 20 for through-conduction of the exhaust gas 7, wherein the flow channels 20 extend in the radial direction 11.

Surfaces 21 of the heat exchanger 10 contacting the exhaust gas 7 along the first flow path 9 have a structured surface, which is therefore larger than a flat surface.

Here, the catalyst body 12 has a catalytically active coating 23 for converting the pollutants contained in the exhaust gas 7.

Figure 2:
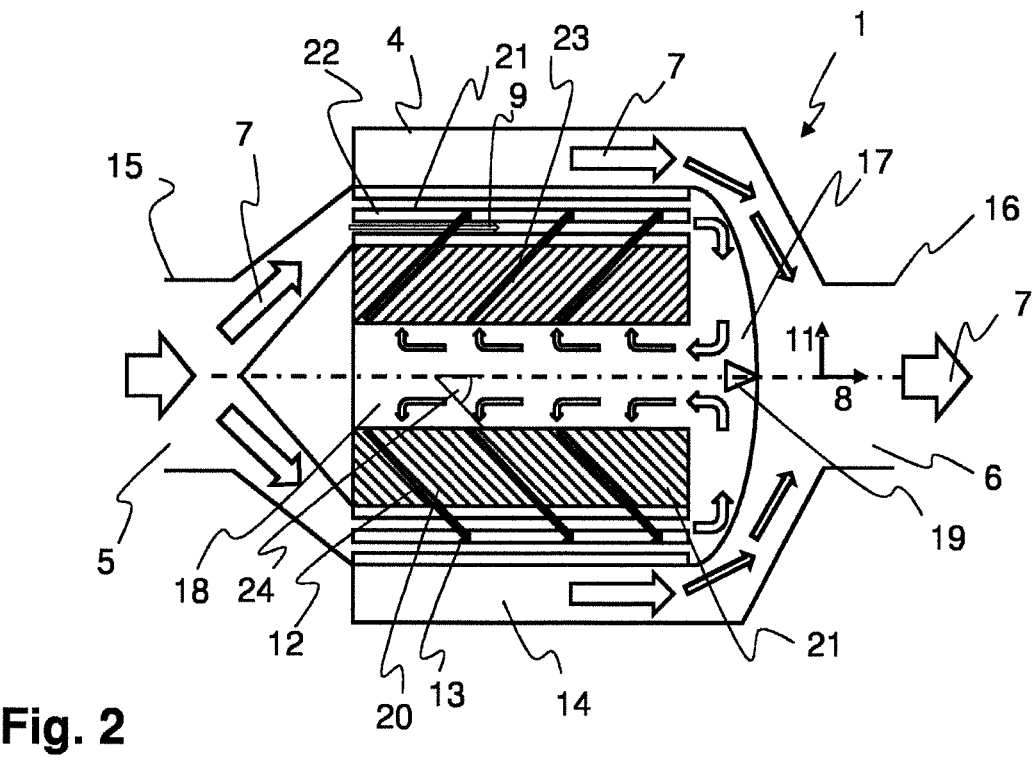
FIG. 2: is a sectional side view of a variant of a component.

In FIGS. 1 and 2, the arrows depict the through-flow direction of the exhaust gas 7. The exhaust gas is here treated in the following steps. In a step a, the exhaust gas 7 enters the inlet 5 of the housing 4 of the component 1 of the exhaust gas system 2. In step b, the exhaust gas 7 is guided in the axial direction 8 and along the first flow path 9 through the annular heat exchanger 10. In step c, the exhaust gas 7 is deflected into the central channel 18 which is arranged in the radial direction 11 inside the heat exchanger 10 and extends in the axial direction 8. In step d, the exhaust gas 7 is deflected from the central channel 18 in the radial direction 11. In step e, the exhaust gas 7 enters the annular catalyst body 12 with through-flow at least in the radial direction 11, so that, downstream of the catalyst body 12, the exhaust gas 7 flows through the heat exchanger 10 in the radial direction 11 and along the second flow path 13.

An annular outflow channel 14 surrounds the heat exchanger 10 outwardly in the radial direction 11, wherein in a step f, the exhaust gas 7 enters the outflow channel 14 downstream of the second flow path 13 and is conducted in the axial direction 8 towards the outlet 6 of the housing 4 of the component 1.

FIG. 2 shows a sectional side view of a second embodiment variant of a component 1. In contrast to FIG. 1, the component 1 has a feed device 19 for a reaction medium in the deflection zone 17. Furthermore, the flow channels 20 of the catalyst body 12 extend in the radial direction 11 and in the axial direction 8. The flow channels are inclined by an angle 24 relative to the axial direction 8. Reference is made to the statements relating to FIG. 1.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A component of an exhaust gas system of an internal combustion engine, comprising:
   at least one housing with a single inlet for an exhaust gas at a first axial end of the housing and a single outlet for the exhaust gas at a second axial end of the housing opposite the first axial end of the housing;
   an annular heat exchanger arranged in the housing and through which the exhaust gas can flow from the inlet in an axial direction and along a first flow path; and
   an annular catalyst body, arranged downstream of the annular heat exchanger and arranged radially inside the annular heat exchanger and through which the exhaust gas can flow at least in a radial direction,
   wherein downstream of the annular catalyst body, the exhaust gas flows through the annular heat exchanger in the radial direction and along a second flow path.

2. The component as claimed in claim 1, wherein an annular outflow channel surrounds the annular heat exchanger outwardly in the radial direction so that the exhaust gas enters the annular outflow channel downstream of the second flow path and leaves the housing via the outlet.

3. The component as claimed in claim 1, wherein the housing extends in the axial direction between the inlet, which is arranged on a first end face of the housing, and the outlet, which is arranged on a second end face of the housing.

4. The component as claimed in claim 1, further comprising:
   a deflection zone arranged downstream of the first flow path and configured to deflect the exhaust gas in an opposing axial direction; and
   a central channel extending in the axial direction is arranged inside the annular catalyst body in the radial direction, and the exhaust gas leaving the deflection zone enters the central channel and from the central channel enters the annular catalyst body.

5. The component as claimed in claim 4, further comprising:
   a feed device for a reaction medium arranged one of upstream of the first flow path or in the deflection zone.

6. The component as claimed in claim 4, wherein the deflection zone is a dome-shaped element.

7. The component as claimed in claim 1,
   wherein the annular catalyst body comprises a plurality of flow channels for through-conduction of the exhaust gas,
   wherein the plurality of flow channels extend at least in the radial direction and in the axial direction.

8. The component as claimed in claim 1, wherein along the first flow path, surfaces of the annular heat exchanger contacting the exhaust gas have a structured surface, which is therefore larger than a flat surface.

9. The component as claimed in claim 8, wherein along the second flow path, the surfaces of the annular heat exchanger contacting the exhaust gas have a structured surface which is therefore larger than a flat surface.

10. The component as claimed in claim 1, wherein a heat exchange medium flows through the annular heat exchanger only in the axial direction.

11. The component as claimed in claim 1, wherein at least one component downstream of the annular catalyst body has a catalytic coating on:
   surfaces of the annular heat exchanger along the second flow path; and
   an annular outflow channel which surrounds the annular heat exchanger outwardly in the radial direction, so that the exhaust gas enters the annular outflow channel downstream of the second flow path and leaves the housing via an outlet.

12. The component as claimed in claim 1, wherein the inlet comprises a conical portion configured to guide the exhaust gas to the annular heat exchanger.

13. The component as claimed in claim 12, wherein a base of the conical portion is arranged at a radially inner portion of the annular heat exchanger.

14. A method for exhaust gas after-treatment for an internal combustion engine, comprising:
   a. entry of an exhaust gas into a single inlet at a first axial end of a housing of a component of an exhaust gas system;
   b. guiding the exhaust gas in an axial direction and along a first flow path through an annular heat exchanger;
   c. deflecting the exhaust gas into a central channel arranged in a radial direction inside the annular heat exchanger and extends in the axial direction;
   d. deflecting the exhaust gas from the central channel in a radial direction;
   e. entry of the exhaust gas into an annular catalyst body with through-flow at least in a radial direction, so that, downstream of the annular catalyst body, the exhaust gas flows through the annular heat exchanger in the radial direction and along a second flow path; and
   f. exiting of the exhaust gas from a single exit at a second axial end of a housing opposite the first axial end of the housing.

15. The method as claimed in claim 14,
   wherein an annular outflow channel surrounds the annular heat exchanger outwardly in the radial direction; and
   the exhaust gas enters the annular outflow channel downstream of the second flow path and is conducted in the axial direction towards an outlet of the housing of the component.

16. A motor vehicle comprising:
   at least an internal combustion engine; and
   an exhaust gas system with a component comprising:
   at least one housing with a single inlet for an exhaust gas at a first axial end of the housing and a single outlet for the exhaust gas at a second axial end of the housing opposite the first axial end of the housing;
   an annular heat exchanger arranged in the housing and through which the exhaust gas can flow from the inlet in an axial direction and along a first flow path; and
   an annular catalyst body, arranged downstream of the annular heat exchanger and arranged radially inside the annular heat exchanger and through which the exhaust gas can flow at least in a radial direction,
   wherein downstream of the annular catalyst body, the exhaust gas flows through the annular heat exchanger in the radial direction and along a second flow path.

\* \* \* \* \*